No. 859,268. PATENTED JULY 9, 1907.
J. F. VOLLMER.
BRAKE FOR VEHICLES.
APPLICATION FILED MAY 22, 1905.
4 SHEETS—SHEET 1.
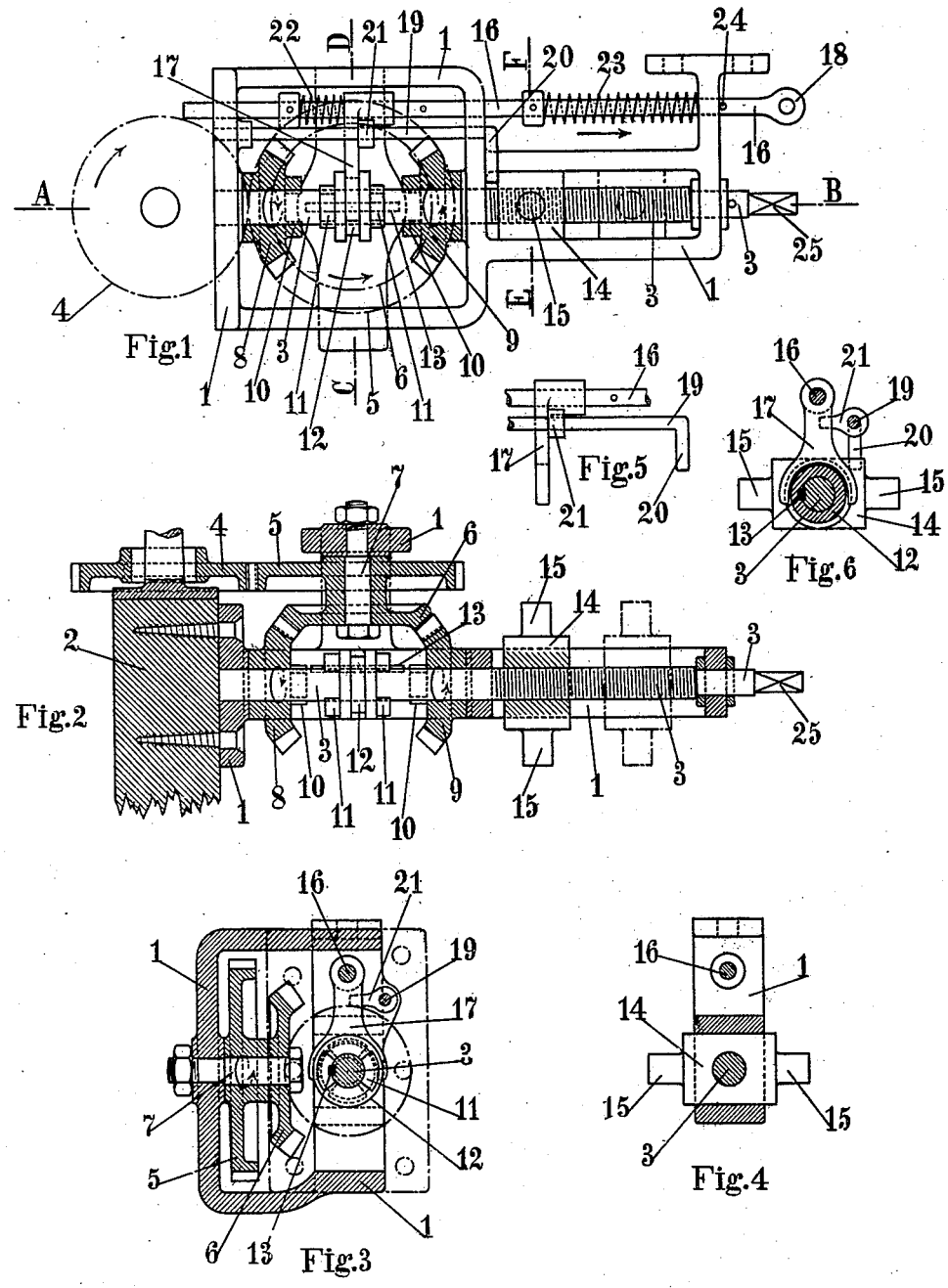
Witnesses
E. D. Bartlett
Albert Yeale
Inventor
Johann Friedrich Vollmer
per Herbert Jefferson Jones
Attorney No. 859,268. PATENTED JULY 9, 1907.
J. F. VOLLMER.
BRAKE FOR VEHICLES.
APPLICATION FILED MAY 22, 1905.

4 SHEETS—SHEET 2.

Witnesses
Inventor
Johann Friedrich Vollmer
per Herbert Sefton Jones
Attorney

No. 859,268. PATENTED JULY 9, 1907.
J. F. VOLLMER.
BRAKE FOR VEHICLES.
APPLICATION FILED MAY 22, 1905.

4 SHEETS—SHEET 3.

Witnesses
E. D. Bartlett
Albert Yeale.

Inventor
Johann Friedrich Vollmer
per Herbert Sefton Jones
Attorney

THE NORRIS PETERS CO., WASHINGTON, D. C.

No. 859,268. PATENTED JULY 9, 1907.
J. F. VOLLMER.
BRAKE FOR VEHICLES.
APPLICATION FILED MAY 22, 1905.
4 SHEETS—SHEET 4.
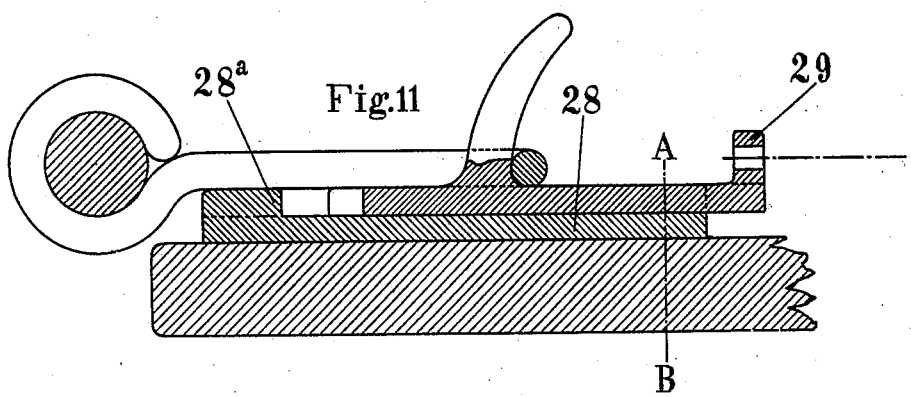
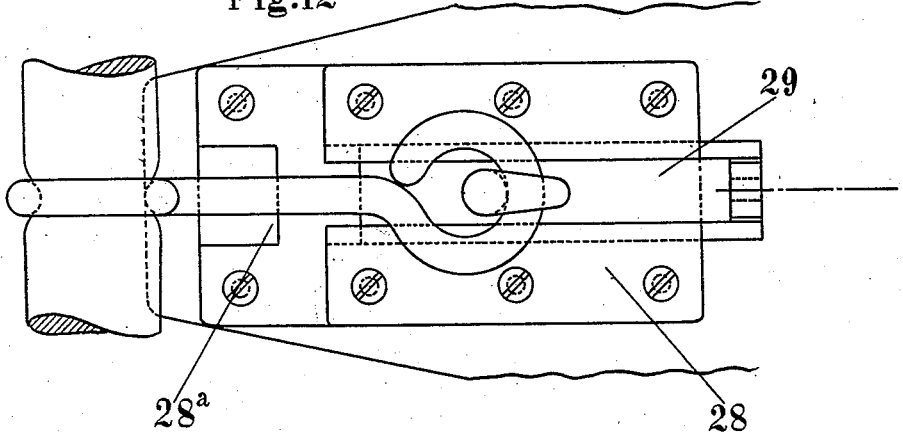
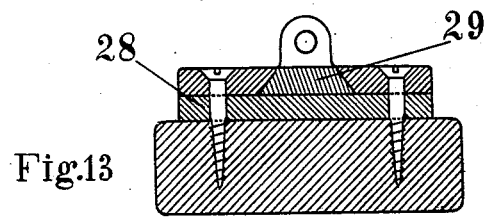
Witnesses
Edwin D. Bartlett
Walter G. Pook
Inventor
Johann Friedrich Vollmer
per Hubert Sefton Jones
Attorney

UNITED STATES PATENT OFFICE.

JOHANN FRIEDRICH VOLLMER, OF HOFEN, NEAR STEINEN, GERMANY.

BRAKE FOR VEHICLES.

No. 859,268.  Specification of Letters Patent.  Patented July 9, 1907.

Application filed May 22, 1905. Serial No. 261,617.

*To all whom it may concern:*

Be it known that I, JOHANN FRIEDRICH VOLLMER, a subject of the Emperor of Germany, residing at Hofen, near Steinen, in the Grand Duchy of Baden and Empire of Germany, have invented a new and useful Improvement in Brakes for Vehicles, of which the following is a specification.

The object of the present invention consists of an improved braking device for vehicles drawn by horse or other power adapted to apply the brakes fully and automatically whenever the road gradient exceeds a certain degree of steepness and to take off the brakes automatically as soon as the road becomes approximately or entirely level or uphill, and having means for retaining the control of the braking apparatus so that the automatic application of the brake can be prevented whenever necessary, as for instance when it is desired to move the vehicle in the stable yard before the draft animals are attached thereto.

The invention is illustrated in the accompanying drawings in which

Figure 7:
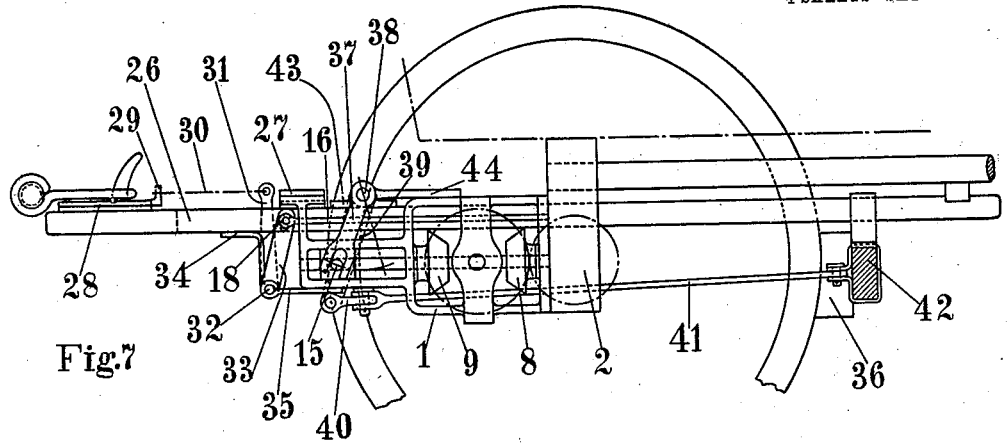
Figure 8:
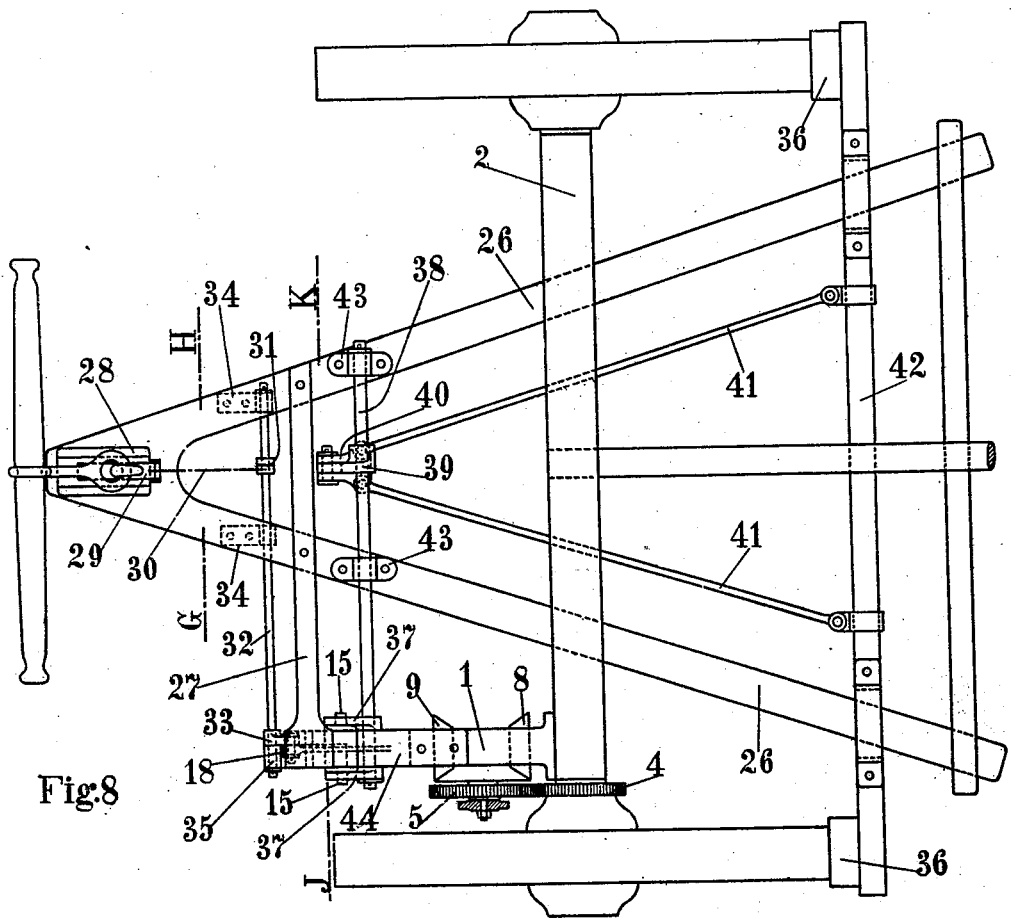
Figure 9:
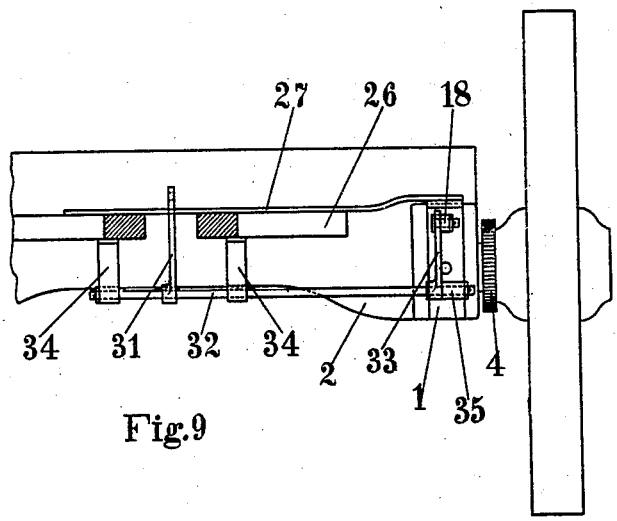
Figure 10:
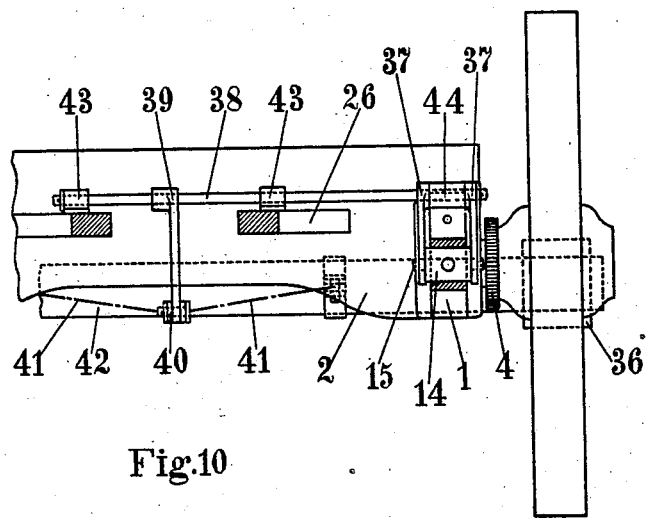

Figure 1 shows a side elevation of the automatic adjustment. Fig. 2 shows the same adjustment in horizontal section on the line A—B of Fig. 1. Fig. 3 shows a transverse section on the line C—D of Fig. 1. Fig. 4 shows a transverse section through the automatic adjustment on the line E—F of Fig. 1. Fig. 5 shows separate working parts of the adjustment viewed in side elevation. Fig. 6 shows the same parts in front view. Figs. 7, 8, 9 and 10 show the application of the device to the front wheels of a wagon. In these views, Fig. 7 is a side elevation, Fig. 8 a plan, Fig. 9 a partial section on the lines G—H of Fig. 8, and Fig. 10 an elevation and partial section on the line J—K of Fig. 8. Fig. 11 shows in sectional elevation the construction of the slide frame 28 and slide 29. Fig. 12 is a plan view of the same and Fig. 13 a section thereof on the line A—B of Fig. 11.

The support of the entire adjusting device is a frame 1 secured directly upon the axle 2 of the vehicle by means of screws, bolts or the like. A shaft 3 is revolubly supported in bearings on this frame in the longitudinal direction. The shaft is capable of receiving whenever necessary a motion of rotation which is sometimes in the one direction and sometimes in the other according as the brake is to be applied or released. Upon the hub of the one wagon wheel is rigidly attached a gear wheel 4, which wheel revolves in one and the same direction as the wagon wheel whenever the vehicle moves. This wheel is constantly engaged with a second gear wheel 5 which freely revolves together with a bevel wheel 6 upon a pivot 7 attached to the frame 1. In this arrangement the gear wheel 5 and the bevel wheel 6 are constantly and fixedly connected one with the other. Consequently whenever the vehicle moves the bevel wheel 6 will revolve about the pivot 7 and in the direction of the arrows marked on the drawing as long of course as the vehicle is moved forwards and not backwards. Two bevel wheels 8 and 9 revolving freely upon the shaft 3, are constantly in engagement with the wheel 6, and revolve in the direction indicated on the drawing by the arrows, one in the positive the other in the negative sense whenever the vehicle is in forward motion. The two last-named cone wheels are each provided with side coupling clutches 10. Between the wheels there is a coupling sleeve 12 adjustable upon the shaft 3 and also provided with clutches 11. A feather 13 fixed in the shaft obliges the sleeve 12 to revolve with the shaft 3, but does not prevent the displacement of the sleeve 12 along the shaft 3. The sleeve 12 possesses in its interior periphery a corresponding groove to accommodate the said feather. The displacement of the sleeve in the one or the other direction brings its coupling clutches into contact with those of the wheel 8 or of the wheel 9, whereupon immediately both the sleeve 12 and the shaft 3 will commence to revolve whenever the vehicle moves. The direction of rotation of the shaft will be positive or negative according as the one or the other of the wheels 8 or 9 is coupled with the sleeve.

In front the shaft 3 is provided with a screw-threading. Upon this threading is placed a sliding block 14 which without revolving can move to and fro in a slot formed through the frame 1 whenever the screw is revolved. The aforesaid block has at each side a projection 15. Upon this projection is suspended a rod which effects the application or removal of the brake blocks to or from the wagon wheels.

In Figs. 1 and 2 are shown the two extreme positions of the block 14. In front the shaft 3 is prolonged into a convenient quadrangular projection adapted to receive a crank handle. Above the shaft 3 and arranged parallel therewith a rod 16 is supported on the frame 1 capable of moving to and fro. This rod has the function of reversing the mechanism, that is of operating the engagement or disengagement of the coupling clutches 11 to or from the coupling clutches 10. This function is effected automatically according to the need of the moment.

The connection between the sleeve 12 and the rod 16 is effected by means of a fork 17. The said fork is attached to the rod 16 firmly, but by means of a spring. The lower fork end engages in an annular groove of the sleeve 12 so that a displacement of the rod 16 is invariably accompanied by an alteration of the position of the sleeve 12 in one and the same direction.

The device operates in the following manner. The traction of the horse or other animal is transmitted by the drawbar 16 through a suitable connection which is attached to the said bar 16 at 18. As soon as the draft animal moves forwards the bar 16 is drawn in the direction of the arrow marked on Fig. 1. If the pull is sufficient, the bar 16 is drawn forward until the claws of the clutch 11 engage with the claws of the clutch 10 of the bevel wheel 9. The shaft 3 is consequently temporarily connected with the bevel wheel 9. As the vehicle is drawn forwards by the draft animal, the shaft 3 revolves in the same direction as the bevel wheel 9. Thereby the block 14 on the threaded part of the shaft 3 is moved backwards. This backward motion is transmitted to the rods controlling the brake blocks of the wagon wheels, and the amount of the back motion of the piece 14 corresponds to a certain distance of the brake blocks from the wheel rims. If therefore the brake was applied before the commencement of the traction it will be taken off in consequence of the revolution of the shaft 3.

The rearward motion of the block 14 is limited by the stopping device illustrated in Figs. 5 and 6, which device is operated by the said block before the end of its stroke. This device consists of a bar 19 supported on the frame 1 which possesses two sidewardly projecting bars 20 and 21. The block in moving backwards strikes towards the end of its stroke against the bar 20 and effects a backward motion of the rod 19. The bar 21 applies itself against the fork 17 and pushes it back, whereupon the spring 22 yields, until the coupling clutch 11 is released from engagement with the coupling clutch 10 of the bevel wheel 9. As at this moment the shaft 3 becomes stationary, the brake blocks will remain in their removed position as long as the traction of the horse or the like continues to exert itself upon the bar 16. If, however, the road becomes an incline, the traction of the animal is proportionately reduced, and this may cease entirely if the place is sufficiently steep to enable the vehicle to move by its own gravity. Upon the bar 16 is placed a spiral spring 23, which spring strives to push back the fork 17 and consequently also the sleeve 12. As soon as the traction of the animal is so relaxed that the spring 23 can operate, it pushes the bar 16, the fork 17 and the sleeve 12 backwards, until the clutch 11 of the sleeve 12 engages with the clutch 10 of the bevel wheel 8. Thereupon the revolution of the shaft 3 commences, and its direction is such that the advance of the block 14 forwards is effected so that the rods controlling the brake blocks effect the approach of the brake blocks to the wheel rims until contact and friction is effected. As soon as the braking becomes so effective that the animal again has to pull, the increased draft exercised upon the bar 16 brings about a displacement of the said bar and consequently causes the sleeve 12 to move forwards. The coupling of the bevel wheel 8 with the shaft 3, thereupon ceases. The application of the brakes, however, continues until the increasing effort of the animal causes a further displacement of the bar 16 and of the sleeve 12 forwards, that is, it causes a coupling of the bevel wheel 9 with the shaft 3, whereupon the operation above described is repeated. This alternate coupling of the bevel wheels 8 and 9 takes place without manual assistance and perfectly automatically according to the need at the moment. The putting into and out of gear is effected always at the required instant by means of the draft itself.

It will be obvious from the foregoing that when the vehicle is not yoked or is standing yoked or is being moved backwards, the coupling clutches 11 of the sleeve 12 will remain constantly in gear with the coupling clutches 10 of the bevel wheel 8. This has certain drawbacks, especially with regard to the mobility of the vehicle when it is required to move it by hand. It becomes therefore necessary to provide the bar 16 with a locking device of some kind which will admit of securing the fork 16 and the sleeve 12 temporarily in the middle position. This can be done by aid of a bolt of any kind which must be operated whenever the vehicle is to be pushed and guided by hand.

In the drawing, this auxiliary device is illustrated by way of example in such a manner that in the bar 16 there is a hole bored at 24 into which a bolt can be inserted for the purpose of temporarily locking it. When the bar 16 is locked it is nevertheless possible to brake the vehicle by hand if there be provided a hand crank or the like at 25.

Figs. 7, 8, 9 and 10 illustrate another construction of the device applied to the wheels of a vehicle and show in what manner the traction of the animal on the bar 16, and consequently the motion of the block 14, can be transmitted to the brake blocks. To the front axle 2 of the vehicle the device is attached exactly in the manner shown in Fig. 2 and strengthened by means of a bar 27 fixed to the frame 26. At the front end of the frame is attached a longitudinally placed horizontal slide frame 28 in which the slide 29 is placed. This slide is in connection with the end point 18 of the bar 16 by means of a suitable attachment such as the drawbar 30, lever 31, shaft 32 and lever 33. The shaft 32 is supported in any desired manner as for instance by means of the brackets 34 and 35. The slide 29 and the slide frame 28 are so constructed that the slide will be firstly drawn forwards through the forward motion of the draft animal, after which in consequence of the striking of a projecting part 28ª the traction of the animal begins to act upon the vehicle. As soon as the traction ceases, the spring 23, through the parts 16, 32, 33 and 31, again draws the slide 29 back into its position of rest. Finally the motion of the block 14 is transmitted by means of suitable rods to the brake blocks 36, for instance by means of the two slotted levers 37, shaft 38, lever 39, connecting piece 40, the two drawbars 41 and connecting rod 42 of the brake blocks, the shaft 38 being supported by the brackets 43 and 44.

The above described automatic brake can be applied to various constructions of vehicles and either to the fore-wheels or to the hind-wheels. Care must always be taken that the connection of the pole with the wagon frame admits of a displacement in the longitudinal direction so that when the traction of the horses or the like begins, the bar 16 is firstly drawn forwards by means of a suitable connecting device, and that only afterwards shall the traction of the animals act upon the vehicle itself. The connecting mechanism which transmits the motion of the block 14 to the brake blocks 36 must be constructed in a suitable manner adapted to the type of vehicle to which it is applied.

What I claim is:

In combination with a vehicle brake, a controlling mechanism either operated by the draft or by hand, comprising a drawbar capable of limited forward motion under the draft, a locking device on said drawbar, a spring on said drawbar adapted to retract it when the draft ceases, a rotatable shaft parallel with said drawbar, an angular projection on the end of said shaft adapted to receive a screw-key for hand adjustment, a double clutch controlled by said drawbar sliding on said shaft and rotating with it, gear wheels rotated in opposite directions by the vehicle wheels, normally loose on said shaft and capable of being alternately clutched to it by said clutch and thereby rotating it, a matrix on said shaft adapted to move along it when the shaft is rotated, the said drawbar being so connected to the clutch that the return of the drawbar under spring pressure and consequent application of the brake blocks to the road wheels disengages the clutch from that gear wheel in which it is engaged and thereby releases the rotatable shaft.

In testimony whereof I have signed my name to this specification in the presence of two subscribing witnesses.

JOHANN FRIEDRICH VOLLMER.

Witnesses:
GEO. GIFFORD,
WILHELM BIENZ.